United States Patent
Steinmacher-Burow

(10) Patent No.: US 9,953,004 B2
(45) Date of Patent: Apr. 24, 2018

(54) DATA PROCESSING SYSTEM WITH MAIN AND BALCONY BOARDS

(71) Applicant: INTERNATIONAL BUSINESS MACHINES CORPORATION, Armonk, NY (US)

(72) Inventor: Burkhard Steinmacher-Burow, Boeblingen (DE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 123 days.

(21) Appl. No.: 14/803,186

(22) Filed: Jul. 20, 2015

(65) Prior Publication Data
US 2016/0026600 A1  Jan. 28, 2016

(30) Foreign Application Priority Data
Jul. 22, 2014 (GB) .................................... 1412963.9

(51) Int. Cl.
*G06F 13/42* (2006.01)
*G06F 13/40* (2006.01)
(Continued)

(52) U.S. Cl.
CPC .......... *G06F 13/4282* (2013.01); *G06F 1/185* (2013.01); *G06F 13/1694* (2013.01);
(Continued)

(58) Field of Classification Search
CPC ...... H05K 1/144; H05K 1/024; H05K 1/0295; G06F 1/185
See application file for complete search history.

(56) References Cited

U.S. PATENT DOCUMENTS 5,613,906 A * 3/1997 Kikinis .................. G06F 1/184
361/678
6,357,023 B1 * 3/2002 Co .......................... G01R 31/01
714/42
(Continued)

FOREIGN PATENT DOCUMENTS

JP 2013186634 A 9/2013
WO 2013127153 A1 9/2013

OTHER PUBLICATIONS

R&D Interconnect Solutions, Invisipin: High Performance Mezzanine, High Performance Test Sockets, 2014, New Jersey, US, http://www.gryphics.com/high-performance-mezzanine.php.

*Primary Examiner* — Farley Abad
(74) *Attorney, Agent, or Firm* — Griffiths & Seaton PLLC

(57) ABSTRACT

A data processing system with a main board and balcony boards. The data processing system includes a mainboard, at least one processor module, and at least one memory module. The system has at least one balcony board carrying at least one of the processor modules and at least one of the memory modules. The processor module has a first pin area for connecting to the balcony board and a second pin area for connecting to the mainboard, such that the balcony board is attached to the mainboard in a fixed position. The balcony board has an opening through which the processor module is plugged in a socket attached to the mainboard. The mainboard has an opening through which the processor module is plugged in a socket attached to the balcony board. A mainboard and a balcony board for a data processing system is also provided.

20 Claims, 15 Drawing Sheets

(51) Int. Cl.
*G06F 13/16* (2006.01)
*G06F 1/18* (2006.01)

(52) U.S. Cl.
CPC ...... *G06F 13/4068* (2013.01); *Y02B 60/1228* (2013.01); *Y02B 60/1235* (2013.01)

(56) References Cited

U.S. PATENT DOCUMENTS

| | | | |
|---|---|---|---|
| 6,512,389 B1 * | 1/2003 | Kocher | G01R 1/07371 324/750.26 |
| 8,351,198 B2 | 1/2013 | Campini et al. | |
| 2004/0027797 A1 | 2/2004 | Yen | |
| 2007/0079041 A1 * | 4/2007 | Yang | G06F 1/185 710/301 |
| 2007/0108611 A1 | 5/2007 | Bartley et al. | |
| 2008/0043448 A1 | 2/2008 | Finnerty et al. | |
| 2008/0304223 A1 | 12/2008 | Franz | |
| 2011/0007473 A1 | 1/2011 | Franz | |
| 2011/0279988 A1 | 11/2011 | Conway | |
| 2013/0135813 A1 | 5/2013 | Jimenez, III et al. | |
| 2013/0223035 A1 | 8/2013 | Jhou | |

* cited by examiner

DATA PROCESSING SYSTEM WITH MAIN AND BALCONY BOARDS

CROSS-REFERENCE TO RELATED APPLICATION

This application claims priority under 35 U.S.C. § 119 from United Kingdom Patent Application No. 1412963.9 filed Jul. 22, 2014, the entire contents of which are incorporated herein by reference.

FIELD OF INVENTION

The present invention relates to data processing systems. More particularly, to a data processing system with a mainboard and balcony boards as well as to a mainboard and balcony boards for a data processing system.

BACKGROUND OF THE INVENTION

Data processing systems are typically built from a variety of components that are assembled into a chassis, such as one or more central processing units (CPUs), dynamic random access memory (DRAM) dual in-line memory modules (DIMMs), hard disk drives (HDDs) and other processing components. End users can tailor a data processing system's capabilities by choosing the number and types of components that are included in the data processing system. One example of this is the number of DRAM DIMMs that are included in a chassis. A server data processing system mainboard can have 48 or more DIMM sockets, each of which accepts a DIMM that stores information for ready access by a CPU. By populating the DIMM sockets with DIMMs, the end user increases the capability of the server's data processing system by increasing storage for the CPU to manage instructions and data. Additional DRAM tends to be particularly helpful with the running of complex applications and with busy data processing systems that have high CPU utilization levels. Data processing system manufacturers will sometimes include empty DIMM sockets on a mainboard so that an end user can populate the sockets with DIMMs if improved performance is desired. If all of the DIMM sockets are populated on a mainboard, then the end user is generally limited from increasing the DRAM that the CPU can access.

Data center rack space for supporting operation of a server data processing system often carries a high overhead expense. Data processing system manufacturers attempt to design the layout of a mainboard so that the data processing system includes a defined capability within a limited space. In order to maximize the processing capability within a chassis while minimizing its vertical height, manufacturers often include mezzanine cards that are positioned over and parallel to the mainboard. The mezzanine cards couple to the mainboard so that processing components on the mezzanine cards can interact with other components coupled to the mainboard. When a small-sized chassis is used to support the mainboard, the mezzanine cards can sometimes overlap other components, such as the DIMM latches, so that all of the components will fit within the chassis. These overlapping components tends to make assembly and repair of the mainboard more complex. For example, if a mezzanine card bracket couples to the mainboard with a screw or other connector and extends over DIMM sockets, then populating or replacing DIMMS in DIMM sockets might call for removal of the mezzanine card and bracket before the DIMM sockets are accessible. The access to DIMM sockets is further complicated by the minimal room typically available to access components and by grounding interfaces that provide a ground from the mainboard through the bracket to the mezzanine card.

US 2013/0223035 AI discloses a mainboard design capable of maximizing the number of expansion cards or components supported by a central processing unit on a mainboard. To achieve the above mentioned objects, the mainboard allows an expansion circuit board to be electrically connected to it. The mainboard has a primary circuit board and an adapter component. The primary circuit board has an expansion slot. The adapter component is connected to the expansion slot, and is used for being electrically connected to the expansion circuit board. The expansion circuit board and the primary circuit board are not located on the same plane.

The adapter component, which US 2013/0223035 AI discloses, has a first adapter circuit board and a second adapter circuit board. One end of the first adapter circuit board is plugged into the expansion slot, and the other end of the first adapter circuit board is connected to the second adapter circuit board in the form of one piece. The second adapter circuit board comprises a first expansion slot, wherein the first expansion slot allows installation of an expansion circuit board.

SUMMARY OF THE INVENTION

The present invention provides a data processing system with capabilities to integrate components in a space, energy and cost saving manner. The present invention also provides a mainboard as well as a balcony board for a data processing system with capabilities to integrate components in a space, energy and cost saving manner.

One aspect of the present invention provides for a data processing system including a mainboard, at least one processor module, and at least one memory module. The system includes: at least one balcony board carrying at least one of the processor modules and at least one of the memory modules. The processor module has a first pin area for connecting to the balcony board and a second pin area for connecting to the mainboard, such that the balcony board is attached to the mainboard in a fixed position. Further, there is an opening in the balcony board through which the processor module is plugged in a socket attached to the mainboard.

One aspect of the present invention provides for a data processing system including a mainboard, at least one processor module, and at least one memory module. The system includes: at least one balcony board carrying at least one of the processor modules and at least one of the memory modules. The processor module has a first pin area for connecting to the balcony board and a second pin area for connecting to the mainboard, such that the balcony board is attached to the mainboard in a fixed position. Further, there is an opening in the mainboard through which the processor module is plugged in a socket attached to the balcony board.

Another aspect of the present invention provides a board for a data processing system that includes a mainboard and a balcony board. The mainboard includes: at least one opening for receiving a processor module and at least one pin area adjacent to the opening on the mainboard. The opening is for connecting the mainboard to a processor module by pins of the at least one pin area of the mainboard and, when installed, by pins of a balcony board at the same side of the processor module. Whereas, the balcony board includes: at least one opening for receiving a processor module and at least one pin area adjacent to the opening on the balcony board. The opening is for connecting the balcony board to a processor module by pins of the at least one pin area of the balcony board and, when installed, by pins of the mainboard at the same side of the processor module.

BRIEF DESCRIPTION OF THE DRAWINGS

The present invention together with the above-mentioned and other objects and advantages may best be understood from the following detailed description of the embodiments, but not restricted to the embodiments, wherein is shown in.

DETAILED DESCRIPTION OF PREFERRED EMBODIMENTS

Figure 1:
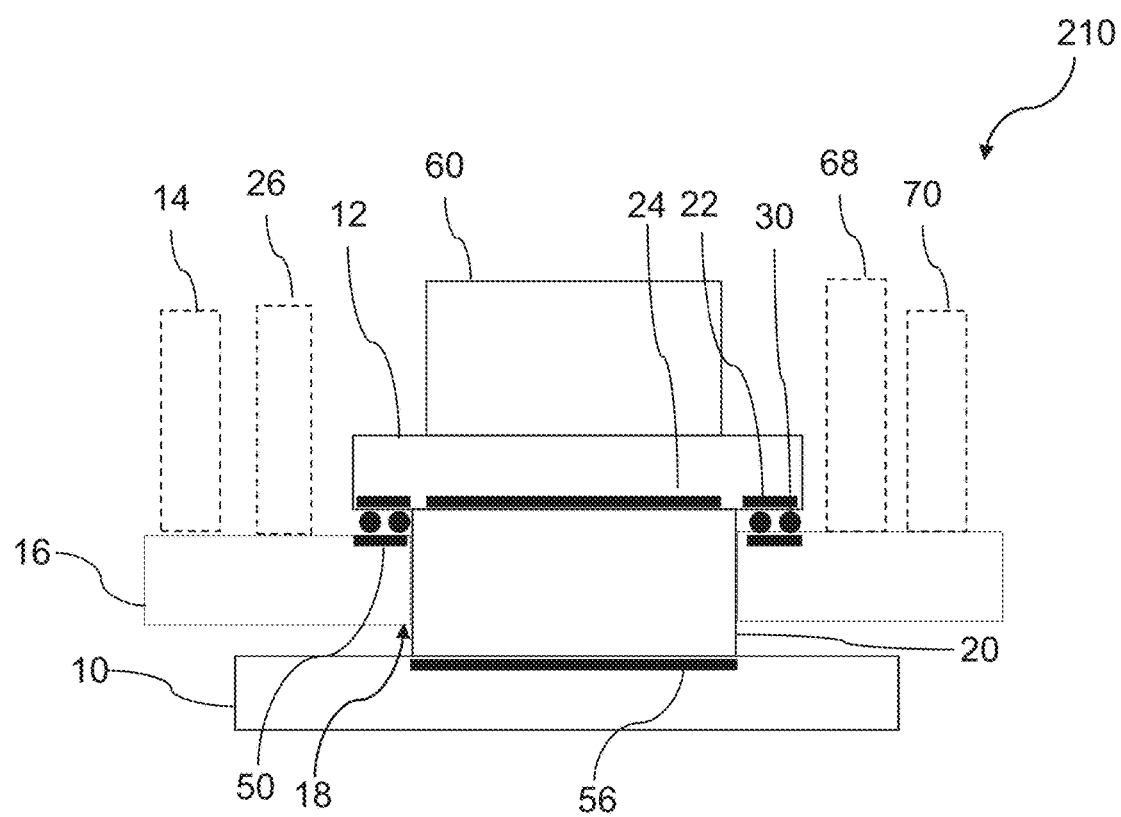
FIG. 1 schematically shows a cross section through a data processing system according to an embodiment of the invention, comprising a balcony board soldered to a processor module on the same bottom side as the processor module is connected by the socket of a mainboard.

Some preferable embodiments will be described in more detail with reference to the accompanying drawings, in which the preferable embodiments of the present invention have been illustrated. However, the present invention can be implemented in various manners, and thus should not be construed to be limited to the embodiments illustrated herein. The embodiments provided are for the thorough and complete understanding of the present invention in order to completely convey the scope of the present invention to those skilled in the art.

Electronic packaging refers to the hardware of an electronic product and its components, except for the silicon dies. The electronic packaging of a data processing system has to satisfy many aspects. For example, cost aspects entail development, bill-of-materials, re-work, or electrical aspects such as signals and power. Whereas, mechanical aspects entail physical fit, assembly, size, weight, tolerances, handling, thermal expansion, corrosion, and aging, as well as minimize risk aspects such as fail rates and other projections. There are cooling aspects and modularity aspects for parts re-use across solutions, upgrades, and field replaceable units. Thus, many aspects have to be satisfied before it is certain that packaging of a data processing system works in practice.

According to the invention, for example, a bottom-side balcony board connects to a part of a bottom-side of a processor module such that the balcony board supports memory, Peripheral Component Interconnect Express (PCIe) expansion, network interface, optical transceiver, power delivery or other components. The processor module's bottom-side remains partially exposed and thus available for connection to a mainboard.

The processor module in this sense may comprise a single chip as well as a small board carrying several chips.

An example embodiment of the present invention can include a mainboard with 2 or more processor modules. The introduction of a balcony board allows a data processing system with either higher performance or lower cost. Higher performance can be achieved because the processor module's communication bandwidth to components on the balcony board can be higher than on the mainboard due to wider signal paths or higher signaling rates enabled within the balcony board. There can exist a total solution with lower cost due to better modularity or the mainboard plus balcony board(s) costs less than an equivalent larger mainboard.

The example embodiment may include 2 processor modules that are each connected onto a mainboard. Each processor module has a bottom-side balcony board connected to the outer edge of the bottom of the processor module. A cut-out or opening in a balcony board exposes the inner area of the bottom of the chip for connection to a land grid array (LGA) socket mounted on the mainboard. Each balcony board supports 2 memory DIMMs. Without the balcony boards, a larger and costlier mainboard would support the memory DIMMs.

A bottom-side balcony board connects to the bottom-side of the processor module, i.e. the same side of the processor module connecting to the mainboard. According to the invention, for a chip soldered onto a bottom-side balcony board, the balcony board opening could horizontally position the processor module on the LGA socket soldered to the mainboard.

A top-side balcony board connects to the top-side of the processor module, i.e. the other side of the processor module to that connecting to the mainboard.

One advantage of the inventive solution is that in many applications the low number of DIMMs per processor allows them to fit on a small balcony board. A further advantage is to be able to increase memory capacity by increasing the number of processor modules in a multiprocessor system. DIMMs on a balcony board allow more processor modules on a mainboard.

Additional advantages are that short links on a balcony board help to increase signal rates. Signal rates can be increasing for DRAM (DDR4, HMC, HBM), PCIe, Ethernet. Further, short links on a balcony board reduce communication energy. This opposes the trend that DRAM-CPU communication consumes increasingly significant energy.

Where feasible, it is cheaper to integrate up-and-coming components on the balcony board than on the processor module. Examples include a Hybrid Memory Cube (HMC), High Bandwidth Memory (HBM), or an Optical Transceiver Chip.

Further, a small balcony board can hold PCIe connectors for a cable to an expansion box holding PCIe cards.

A mainboard can have one or more processor modules that connect to DIMM memory, PCIe expansion, network interface, optical transceiver, power delivery or other components mounted on the mainboard. An increasing number of processor modules or components therefore require a larger mainboard area or number of signal layers in the mainboard.

A balcony board can include one or more processor modules that connect to one or more components mounted on the balcony board. Components may be DIMM memory, PCIe expansion, network interface, optical transceiver, power delivery or other components mounted on the balcony board. The respective component and its connection remains local to the balcony board and enables a smaller or simpler mainboard.

In particular, if a mainboard supports multiple processor chips that each have components, then this can place upper limits on the number of processor modules on a mainboard due to limits on the area of a mainboard or the number of signal layers. A larger mainboard area or a larger number of signal layers with a larger number of components can cause higher cost, larger manufacturing difficulties, and/or larger repair difficulties.

The problem above and other problems may be overcome based on the present invention by moving some of the components associated with a processor module from the mainboard to the balcony board.

According to the present invention, a balcony board directly connects to a processor module, which is also directly connected to the mainboard. In some scenarios, a balcony board can also be directly connected to the mainboard for power or other signals.

Further advantages of the present invention include that any processor module may be used and it is not restricted to a processor chip (e.g. a large field programmable gate array (FPGA), or a network chip). The mainboard with balcony boards may be a large switch consisting of multiple network chips. The present invention can be used for any electronic system, not just a data processing system. The same balcony board may be used for different systems, e.g. for 1, 2, 4, 8 socket computers. The balcony board may be connected via an LGA socket or directly soldered to the processor module. The mainboard may be connected via an LGA socket or directly soldered to the processor module. Different processor modules or different balcony boards may be mounted onto the multiple sockets of a mainboard. The inventive solution exhibits the general attractiveness of a cost-effective multiprocessor system with many processor modules. Different circuit card characteristics such as number of layers and flame resistant epoxy material (i.e. FR4 versus high-frequency Megtron material) can be used for the mainboard and balcony board.

In one embodiment of the present invention, the first pin area and the second pin area of the processor module can be located on the same side such that the balcony board and the mainboard are connected on the same side of the processor module.

In another embodiment of the present invention, the first pin area and the second pin area of the processor module can be located on different sides such that the balcony board and the mainboard are connected on different sides of the processor module.

The balcony board can carry one or more PCIe connectors, which enables connection of PCIe expansions to the mainboard. This saves space on the mainboard because the PCI connectors are located on the balcony board where more space is available.

An embodiment of the present invention includes an opening in the balcony board that can be configured as an alignment tool for horizontal alignment of the balcony board with the processor module and/or the socket. Alignment of the balcony board to the pins of the processor module and/or the socket of the mainboard is a significant feature in the manufacturing process of a data processing system. So, it is an important advantage if the balcony board carries an inherent feature for alignment with the processor module and/or the socket of the mainboard.

In an alternative embodiment of the present invention, the opening in the mainboard is configured as an alignment tool for horizontal alignment of the mainboard with the processor module and/or the socket. Thus, the mainboard can also be successfully and efficiently aligned during the manufacturing process.

In various embodiments of the present invention, the processor module can be connected to the balcony board via a direct soldering contact or via a socket, whereas the processor module can also be connected to the mainboard via a direct soldering contact or a socket. These are the main connection types available and every combination is possible depending on the specific needs for manufacturing and/or repair possibilities.

The mainboard and/or the balcony board may be connected via the processor module in a socket of the mainboard or a socket of the balcony board. Thus, the mainboard and/or the balcony board may be assembled and disassembled in the data processing system in an easy and economical way.

A pin area of the processor module typically consists of multiple pins for connection to a board. The board has traces, wires or other means to connect the pins from the processor module to the corresponding contacts of a DIMM, PCIe connector or other component supported by the board.

The pins of the processor module may be implemented as a Land Grid Array (LGA) which is a grid of contacts. An LGA module typically can be used in a corresponding LGA socket mounted on a board or the LGA module can be soldered onto a board by using surface mount technology. A pin area of the processor module may be a portion of the LGA of the processor module. A pin area of the mainboard or the balcony board may be contacts to be soldered to the LGA area of the processor module. A pin area of the mainboard or the balcony board may be contacts in an LGA socket for an LGA area of the processor module.

In an embodiment of the present invention, the material of the mainboard may have dielectric parameters which are different from dielectric parameters of the material of the balcony board. Therefore, it is possible to realize different frequencies in signal connections due to the different dielectric parameters of the boards. For example, the signal connections in the balcony board can be laid out for higher frequencies with a more expensive board material (e.g. Megtron because their accesses to memory chips are serviced), whereas the larger mainboard may be laid out for lower frequencies with a cheaper board material (e.g. the standard board material FR4).

In various embodiments of the present invention, the processor module may be a network chip. So, the inventive solution with balcony boards can be used for network switches with multiple network chips on a mainboard.

The processor module may be arranged in a communication line between the mainboard and the balcony board. So, in an embodiment where the processor module is connected to both the mainboard and the balcony board in a direct way, it can serve as a communication switch between the mainboard and the balcony board.

If at least one balcony board is connected to at least one network chip being arranged on the mainboard, then the balcony board can be used in a network switch configuration.

The present invention proposes a data processing program for execution in a data processing system including an implementation of an instruction set for operating a data processing system as described above when the data processing program is run on a computer.

FIG. 1 shows a cross section through data processing system 210 according to an embodiment of the invention that includes: balcony board 16 soldered to processor module 12 on the same bottom side as processor module 12 is connected by socket 20 of mainboard 10. The single components of data processing system 210 and the connections between the components in FIG. 1 as well as in all other drawings are merely roughly sketched to show the principle of design, but not all physical details. Also, pin areas 22, 24, 50, 52, 54, 56 are only sketched as a bar and not detailed any further. A pin area of the processor module typically consists of multiple pins for connection to a board. The board has traces, wires or other means to connect the pins from the processor module to the corresponding contacts of a DIMM, PCIe connector or other component supported by the board.

The pins of the processor module may be implemented as a Land Grid Array (LGA) which is a grid of contacts. An LGA module typically can be used in a corresponding LGA socket mounted on a board or the LGA module can be soldered onto a board by using surface mount technology. A pin area of the processor module may be a portion of the LGA of the processor module. A pin area of the mainboard or of the balcony board may be contacts to be soldered to the LGA area of the processor module. A pin area of the mainboard or of the balcony board may be contacts in an LGA socket for an LGA area of the processor module.

Referring to FIG. 1, data processing system 210 includes: mainboard 10, at least one processor module 12, and at least one memory module 14. Data processing system 210 also includes: at least one balcony board 16 carrying at least one of the processor modules 12 and at least one of the memory modules 14. Processor module 12 has first pin area 22 for connecting to balcony board 16 and second pin area 24 for connecting to mainboard 10, such that balcony board 16 is attached to mainboard 10 in a fixed position. Further, data processing system 210 includes: opening 18 in balcony board 16 through which processor module 12 is plugged in socket 20 attached to mainboard 10. First pin area 22 and second pin area 24 are located on the same side of processor module 12, which is connected to balcony board 16 via a direct soldering contact 30, to mainboard 10 via socket 20, and to socket 20 by way of LGA contacts 32 (not shown).

Thus, processor module 12 is arranged in a communication line between mainboard 10 and balcony board 16.

The material of mainboard 10 may have dielectric parameters, which are different from dielectric parameters of the material of balcony board 16. Thus, it is possible to realize different frequencies in signal connections due to the different dielectric parameters of the boards. For example, the signal connections in balcony board 16 can be laid out for higher frequencies with a more expensive board material (e.g. Megtron because their accesses to memory chips 14 are serviced), whereas the larger mainboard 10 may be laid out for lower frequencies with a cheaper board material (e.g. the standard board material FR4).

Balcony board 16 for data processing system 210 has at least one opening 18 for receiving processor module 12 and at least one pin area 50 adjacent to opening 18 on balcony board 16. Opening 18 is for connecting balcony board 16 to processor module 12 by pins of at least one pin area 50 of balcony board 16 and, when installed, by pins 56 of mainboard 10 at the same side of processor module 12.

Other than the DIMM memory module 14, balcony board 16 may carry PCIe expansion 26, optical transmitter/receiver 68, and power supply 70. These components are optional on balcony boards 16 of all other embodiments shown hereafter. Processor module 12 is cooled by heat sink 60 in all embodiments shown. Heat sink 60 can be a typical metal radiator for air-cooling or represent another cooling solution such as the liquid of immersion cooling.

For processor module 12 soldered onto the bottom-side balcony board 16, opening 18 could horizontally position processor module 12 on socket 20 soldered to mainboard 10.

Pin area 22 of processor module 12 is soldered to pins 50 of balcony board 16, whereas socket 20 of mainboard 10 is soldered to pins 56 of mainboard 10 and socket 20 is mounted to pin area 24 of processor module 12 by LGA contacts.

Figure 2:
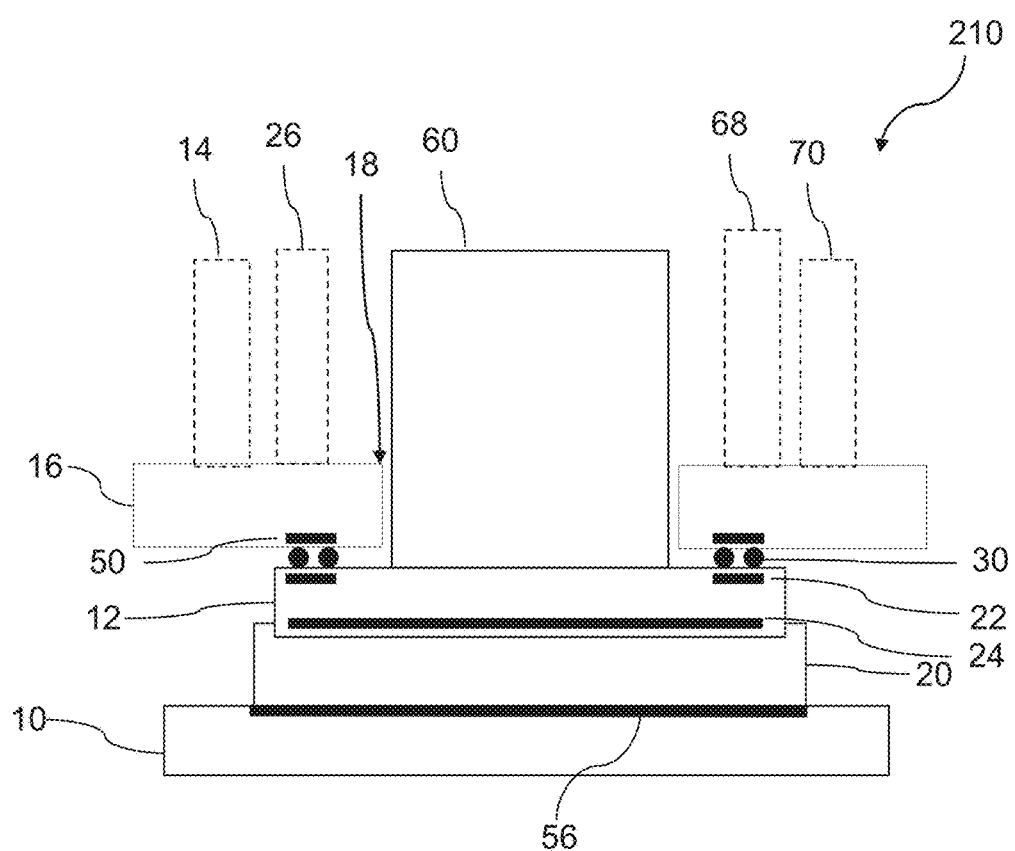
FIG. 2 schematically shows a cross section through a data processing system according to an embodiment of the invention, comprising a balcony board soldered to a processor module on the top side, whereas the processor module is connected by the socket of a mainboard on the bottom side of the processor module.

In FIG. 2, the data processing system 210 includes: balcony board 16 soldered to processor module 12 on the top side, whereas processor module 12 is connected by socket 20 of mainboard 10 on the bottom side. First pin area 22 and second pin area 24 are located on different sides of the processor module 12 in this embodiment.

Figure 3:
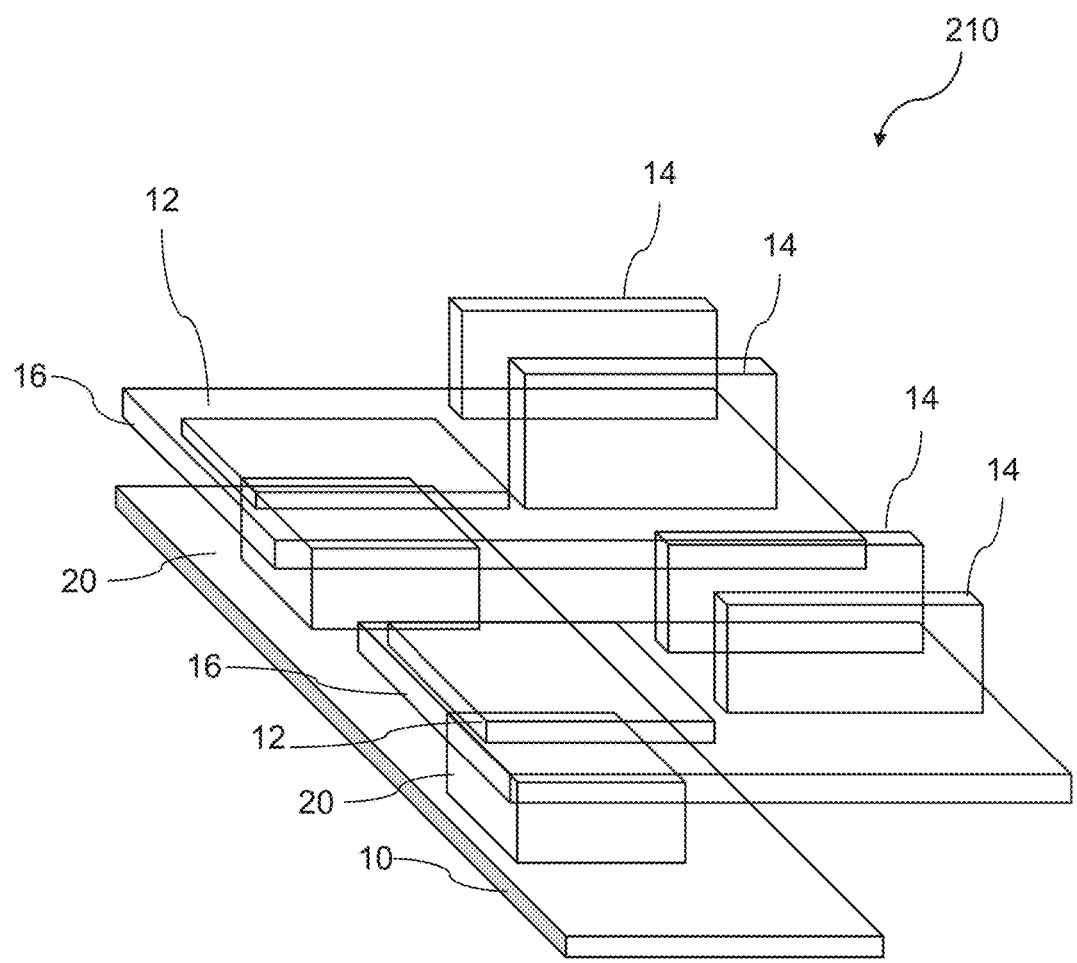
FIG. 3 schematically shows an isometric view of an embodiment of the invention with balcony boards mounted to the bottom sides of processor modules, whereas the processor modules are connected to a mainboard via sockets also connecting to the bottom sides of the processor modules.

Referring to FIG. 3, balcony boards 16 are mounted to the bottom sides of processor modules 12 and processor modules 12 are connected to mainboard 10 via sockets 20 also on the bottom sides. Balcony boards 16 each carry a number of DIMM memory modules 14. Processor module 12 is soldered at pin area 22 to pins 50 of balcony board 16. Processor module 12 is soldered at pin area 24 by LGA contacts to socket 20 of mainboard 10. Socket 20 is soldered to pins 56 of mainboard 10.

Figure 4:
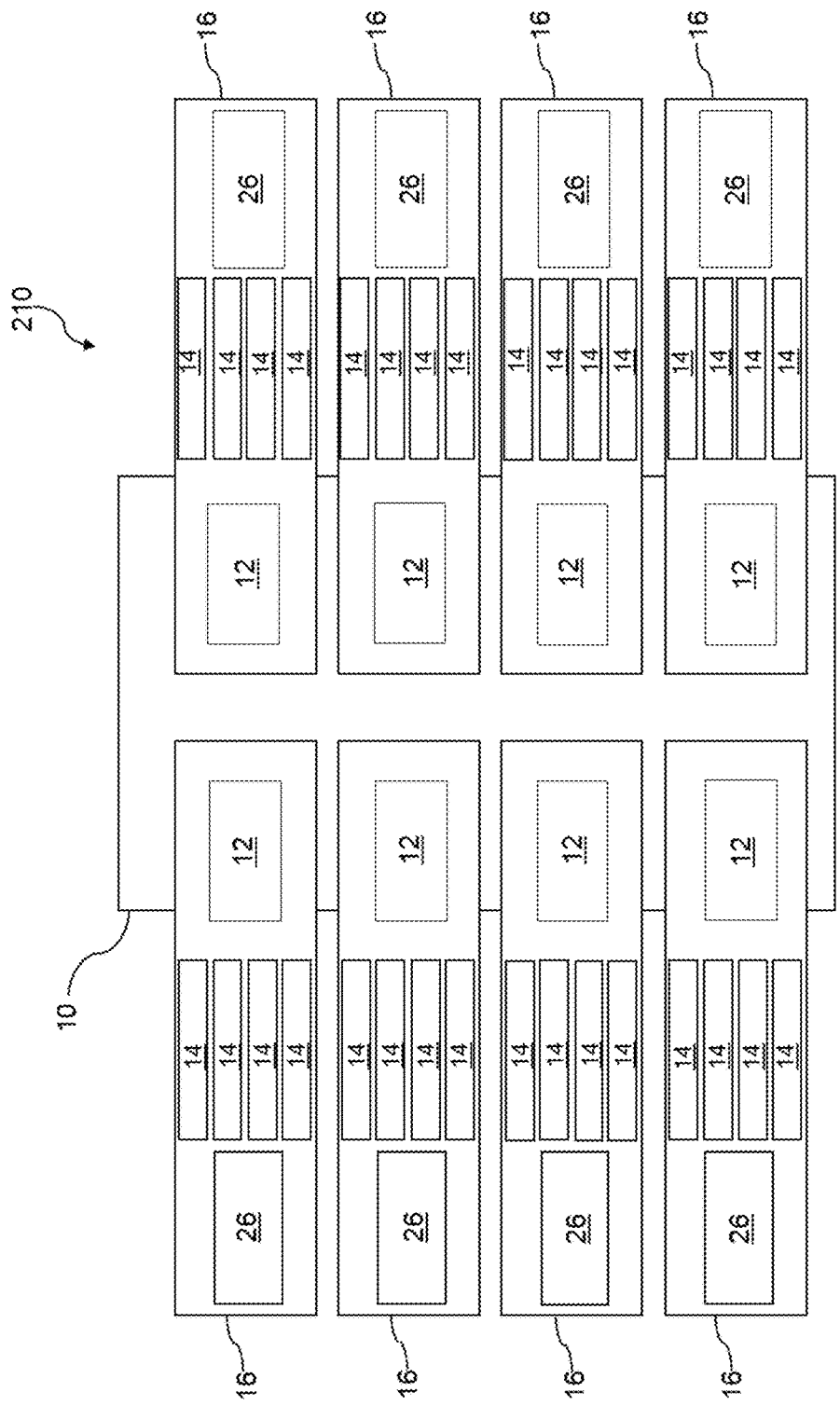
FIG. 4 schematically shows a top view on an embodiment of the invention where balcony boards are mounted on the bottom sides of processor modules, equipped with Peripheral Component Interconnect Express (PCIe) connectors, where the mainboard is mounted via sockets also connected to the bottom sides of the processor modules.

In FIG. 4, balcony boards 16 equipped with PCIe connectors 26 are mounted on the bottom sides of processor modules 12. Mainboard 10 is mounted to the bottom sides of processor module 12 via sockets 20.

Each balcony board 16 is carrying one or more PCIe connectors 26 as well as a number of DIMM memory modules 14.

Figure 5:
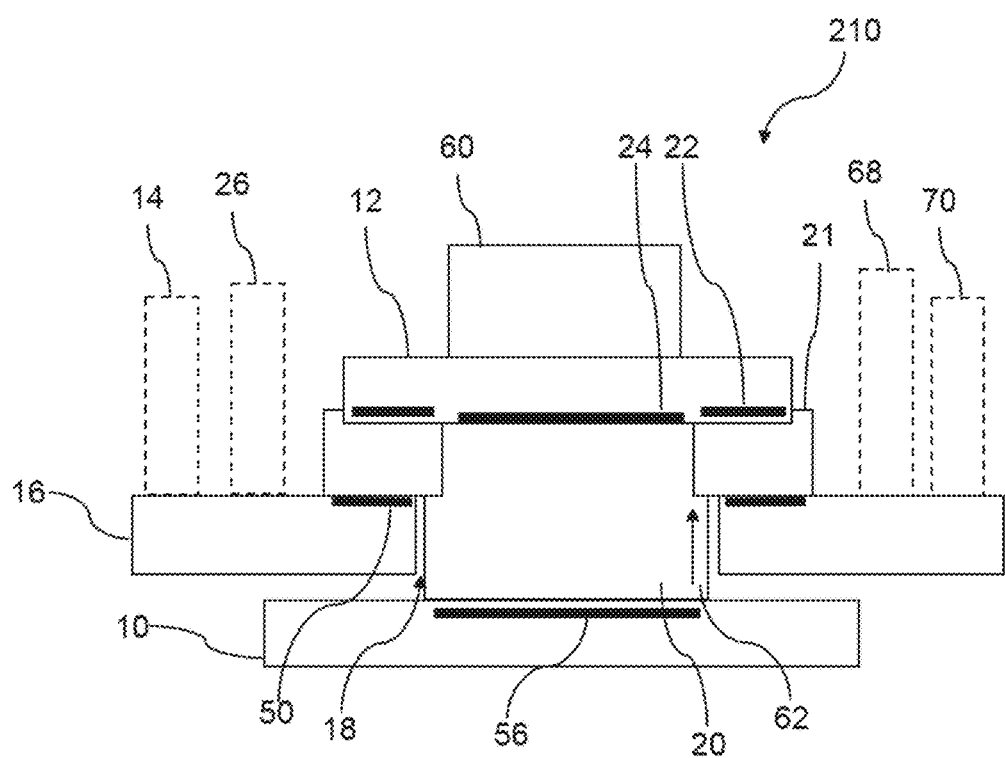
FIG. 5 schematically shows a cross section through a data processing system according to an embodiment of the invention, comprising a balcony board connected via a socket to a processor module on the same bottom side as the processor module is connected by the socket of a mainboard.

FIG. 5 shows data processing system 210 that includes: balcony board 16 connected via socket 21 to processor module 12 on the same bottom side as processor module 12 is connected by socket 20 of mainboard 10. Socket 20 is soldered to mainboard 10, whereas socket 21 is soldered to balcony board 16. Opening 18 in balcony board 16 serves for mounting socket 20 of mainboard 10 to processor module 12.

Processor module 12 is connected to balcony board 16 via socket 21 and mainboard 10 via socket 20. Processor module 12 is connected to sockets 20, 21 via LGA contacts 32.

Opening 18 in balcony board 16 is configured as an alignment tool for horizontal alignment of balcony board 16 with processor module 12 and/or socket 20. Socket 20 of mainboard 10 and socket 21 of balcony board 16 fit snugly horizontally in order to position processor module 12 on both boards 10, 16. Alignment stop 62 surrounding socket 20 of mainboard 10 vertically positions socket 21 of balcony board 16 so that both are aligned for processor module 12.

Figure 6:
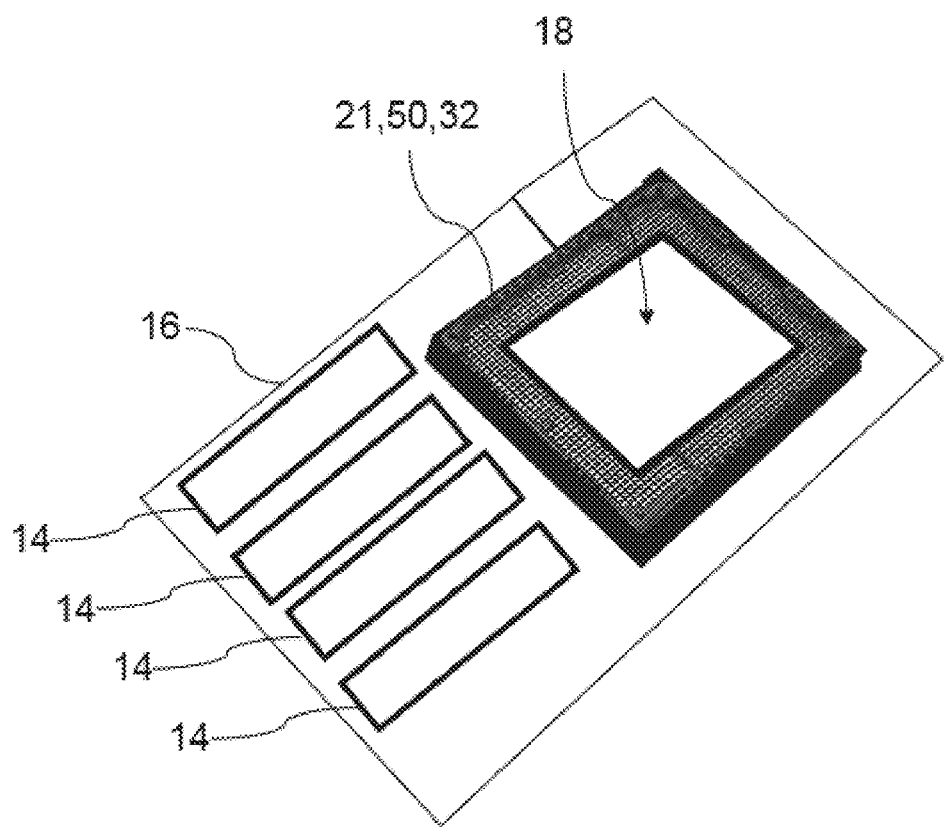
FIG. 6 schematically shows a top view on the balcony board as shown in the embodiment of FIG. 5.

FIG. 6 shows a top view of balcony board 16 based on the embodiment shown in FIG. 5. Opening 18 in balcony board 16 serves for mounting socket 20 of mainboard 10 to processor module 12. Opening 18 for socket 20 of mainboard 10 is surrounded by socket 21 for connecting balcony board 16 to processor module 12. Balcony board 16 is carrying four memory modules 14.

Figure 7:
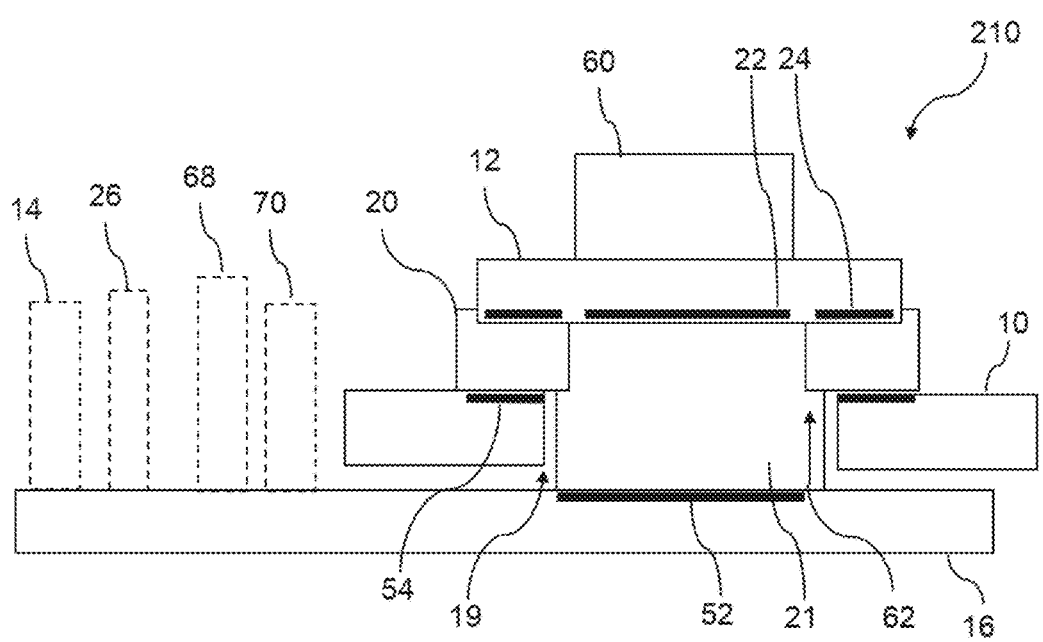
FIG. 7 schematically shows a cross section through a data processing system according to an embodiment of the invention, comprising a balcony board connected via a socket to a processor module through an opening in a mainboard on the same bottom side as the processor module is connected by the socket of the mainboard.

In FIG. 7, a cross section through data processing system 210 is shown, which includes: balcony board 16 connected via socket 21 to processor module 12 through opening 19 in mainboard 10 on the same bottom side as processor module 12 is connected by socket 20 of mainboard 10. Data processing system 210 has mainboard 10, at least one processor module 12, and at least one memory module 14. Further, data processing system 210 has at least one balcony board 16 carrying at least one processor module 12 and at least one memory module 14. Processor module 12 includes: first pin area 22 for connecting to balcony board 16 and second pin area 24 for connecting to mainboard 10, such that balcony board 16 is attached to mainboard 10 in a fixed position. Data processing system 210 also includes: opening 19 in mainboard 10 through which processor module 12 is plugged in socket 21, which is attached to balcony board 16.

Opening 19 in mainboard 10 is configured as an alignment tool for horizontal alignment of mainboard 10 with processor module 12 and/or socket 21. Alignment stop 62 surrounding socket 21 of balcony board 16 vertically positions socket 20 of mainboard 10 so that both are aligned for processor module 12.

Mainboard 10 for data processing system 210 includes: at least one opening 19 for receiving processor module 12 and at least one pin area 54 adjacent to opening 19 on mainboard 10. Opening 19 is for connecting mainboard 10 to processor module 12 by pins of at least one pin area 54 of mainboard 10 and, when installed, by pins 52 of balcony board 16 at the same side of processor module 12.

Processor module 12 is connected to balcony board 16 via socket 21, wherein processor module 12 is connected to mainboard 10 via socket 20.

Figure 8:
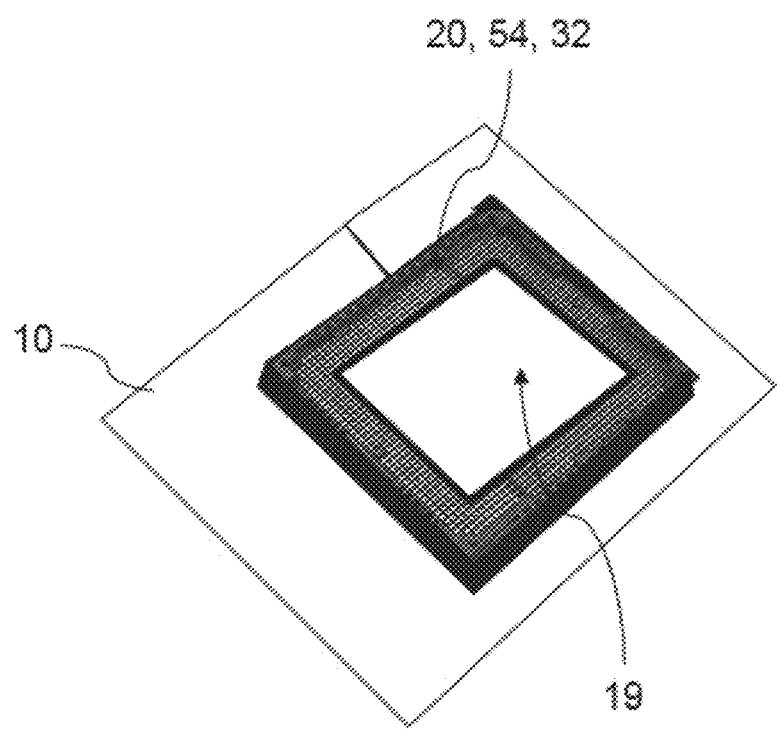
FIG. 8 schematically shows a top view on the mainboard as shown in the embodiment of FIG. 7.

FIG. 8 shows a top view of mainboard 10 based on the embodiment of the invention from FIG. 7. Opening 19 in mainboard 10 serves for mounting socket 21 of balcony board 16 to processor module 12. Opening 19 for socket 21 of balcony board 16 is surrounded by socket 20 for connecting mainboard 10 to processor module 12.

Figure 9:
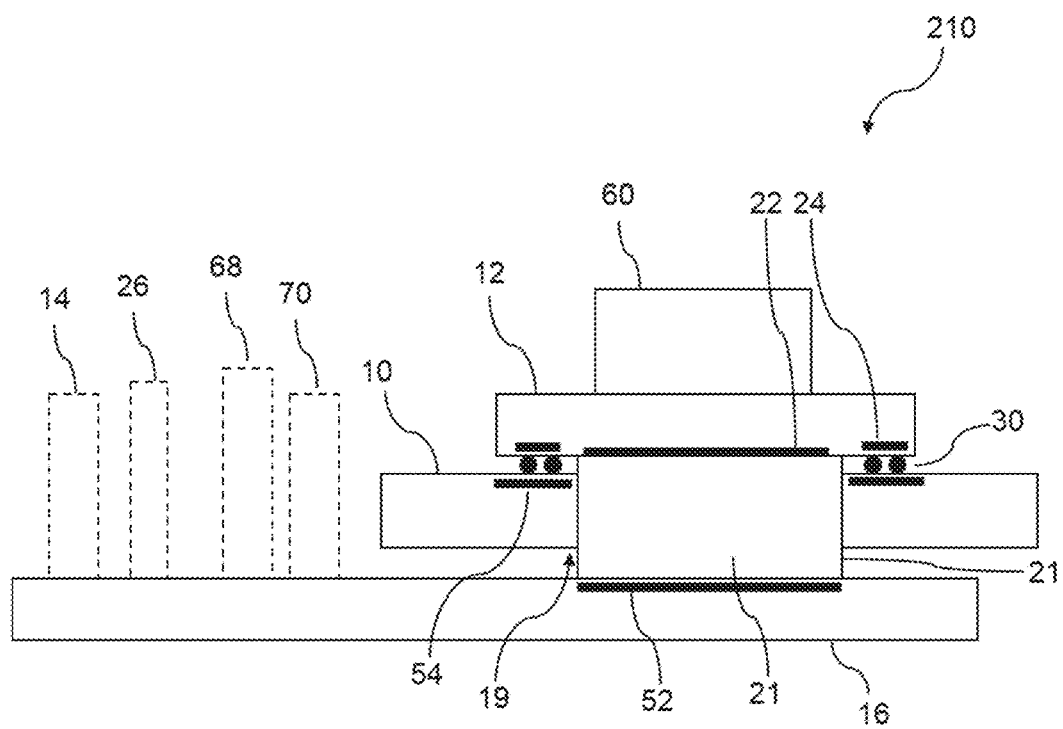
FIG. 9 schematically shows a cross section through a data processing system according to an embodiment of the invention, comprising a balcony board connected via a socket to a processor module through an opening in a mainboard on the same bottom side as the processor module is soldered to the mainboard.

FIG. 9 shows a cross section through data processing system 210 that includes: balcony board 16 connected via socket 21 to processor module 12 through opening 19 in mainboard 10 on the same bottom side as processor module 12 is soldered to mainboard 10.

Processor module 12 is connected to balcony board 16 via socket 21, wherein processor module 12 is connected to mainboard 10 via direct soldering contact 30. Socket 21 is soldered to balcony board 16 as well.

For processor module 12 soldered onto bottom-side balcony board 16, opening 19 (the board cut-out) can horizontally position processor module 12 on socket 21, which is soldered to balcony board 16.

Figure 10:
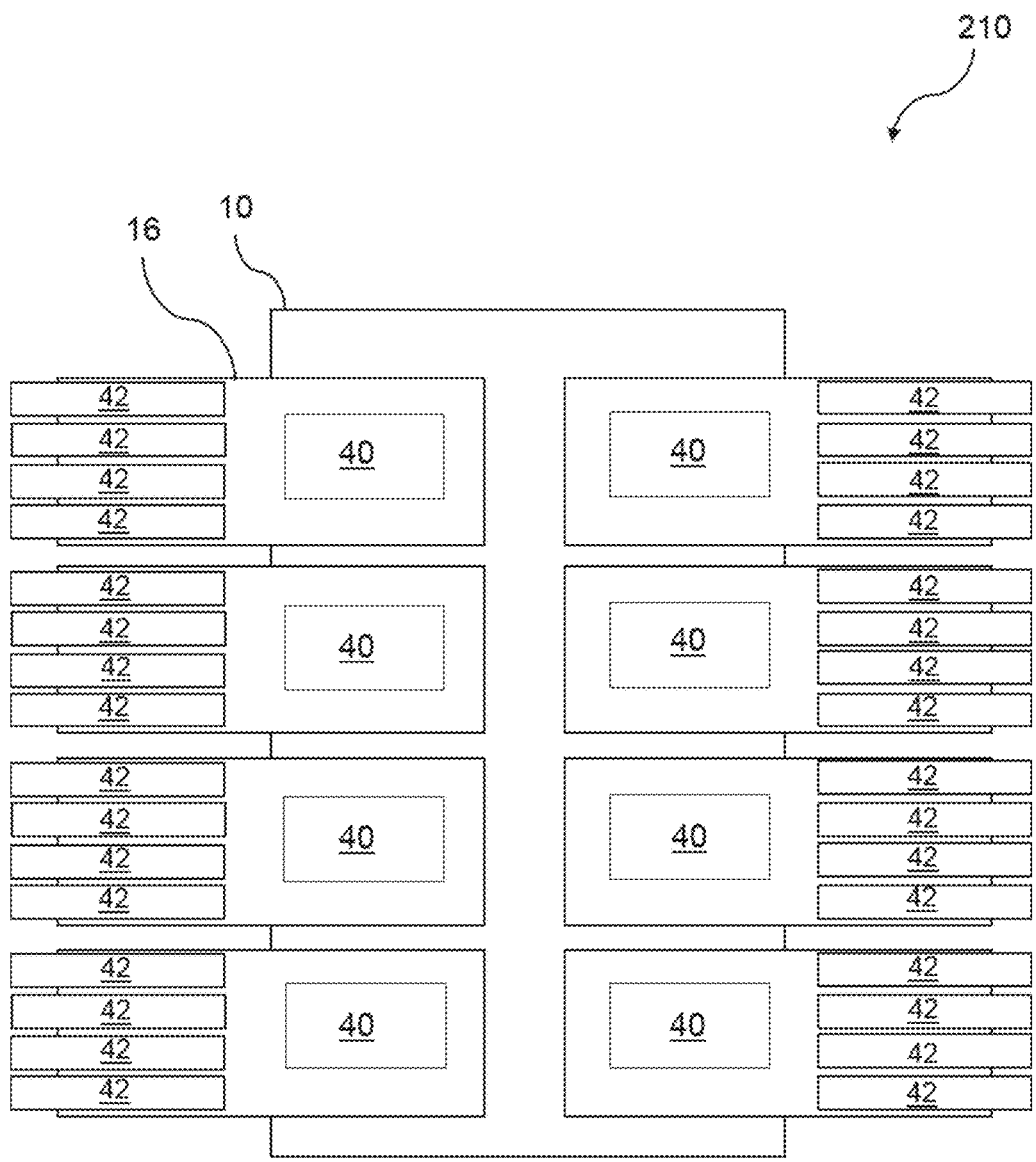
FIG. 10 schematically shows a top view on an embodiment of the invention where balcony boards are mounted on the bottom sides of processor modules, where the processor module is a network chip, the balcony boards equipped with ports for being connected as a network switch, where the mainboard is mounted via sockets also on the bottom sides of the processor modules.

Referring to FIG. 10, balcony boards 16 and mainboard 10 (via sockets 20) are mounted on the bottom sides of processor modules 12. In addition, where processor module 12 is network chip 40, balcony boards 16 are equipped with ports 42 for being connected as a network switch.

In the embodiment of the present invention shown in FIG. 10, processor module 12 is network chip 40. Balcony boards 16 are connected to network chips 40 being arranged on mainboard 10.

Figure 11:
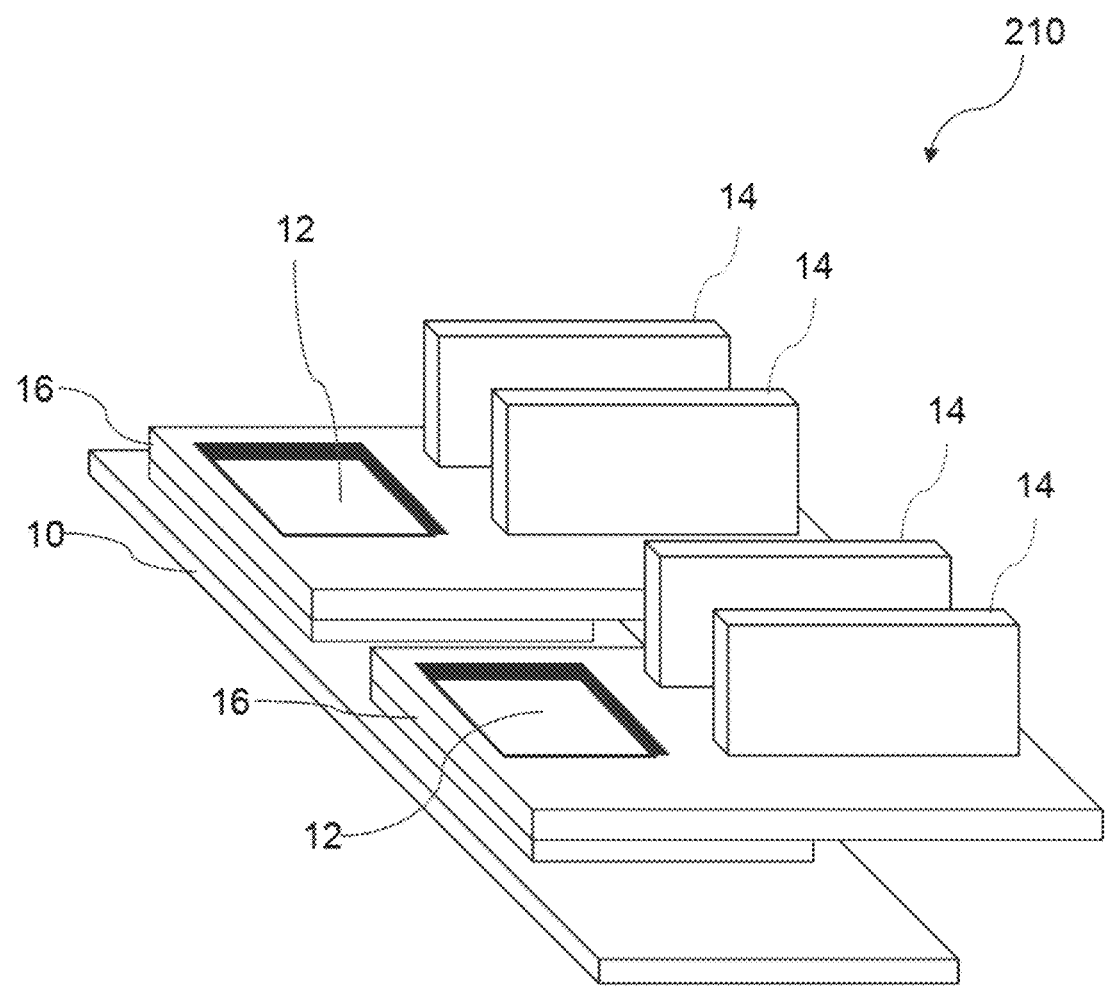
FIG. 11 schematically shows an isometric view of an embodiment of the invention with balcony boards mounted to the top sides of processor modules, whereas the processor modules are connected to a mainboard via sockets connecting to the bottom sides of the processor modules.

FIG. 11 gives an isometric view of an embodiment of the present invention. Balcony boards 16 are mounted to the top sides of processor modules 12, whereas mainboard 10 is connected via sockets 20 to the bottom sides of processor modules 12.

Figure 12:
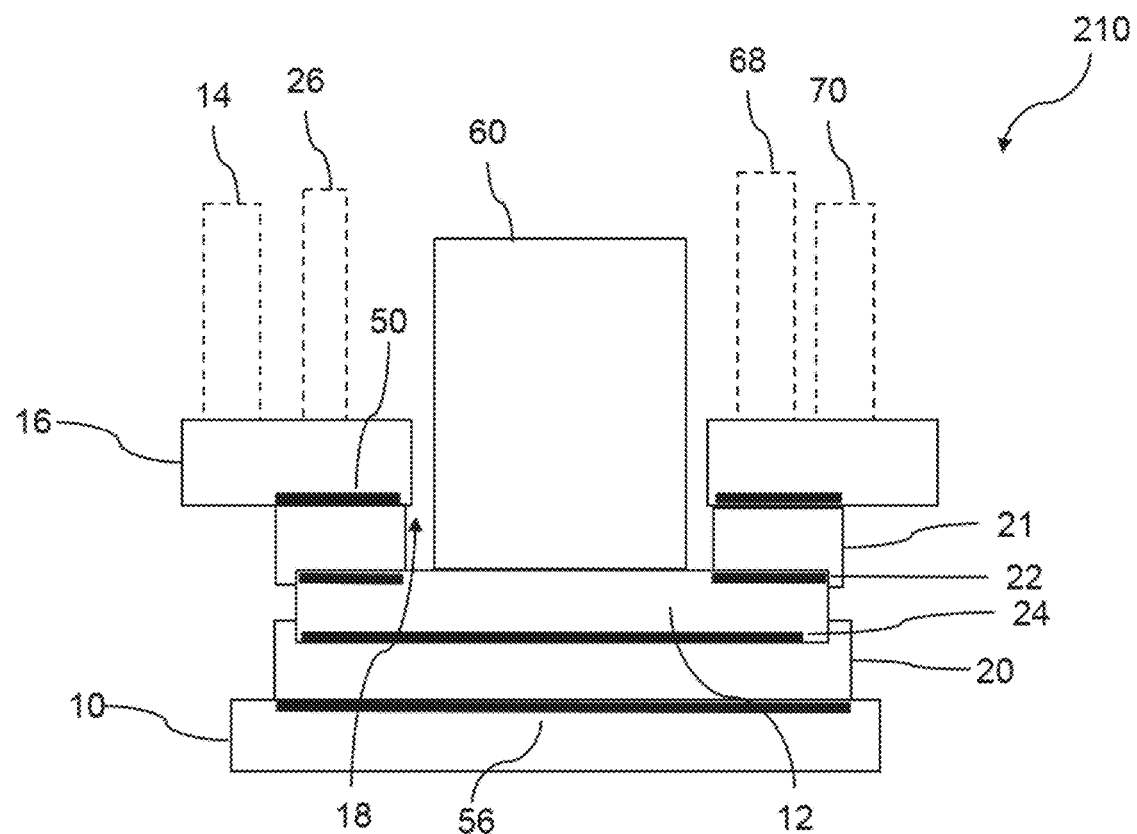
FIG. 12 schematically shows a cross section through a data processing system according to an embodiment of the invention, comprising a balcony board connected to a processor module via a socket on the top side of the processor module, whereas the processor module is connected by the socket of a mainboard on the bottom side of the processor module.

FIG. 12 shows a cross section through a data processing system 210 that includes: balcony board 16 connected to processor module 12 via socket 21 on the top side of processor module 12, whereas mainboard 10 is connected via socket 20 to the bottom side of processor module 12.

Processor module 12 is connected to balcony board 16 via socket 21, which is directly soldered to balcony board 16. Processor module 12 is also connected to mainboard 10 via socket 20, which is directly soldered to mainboard 10.

Figure 13:
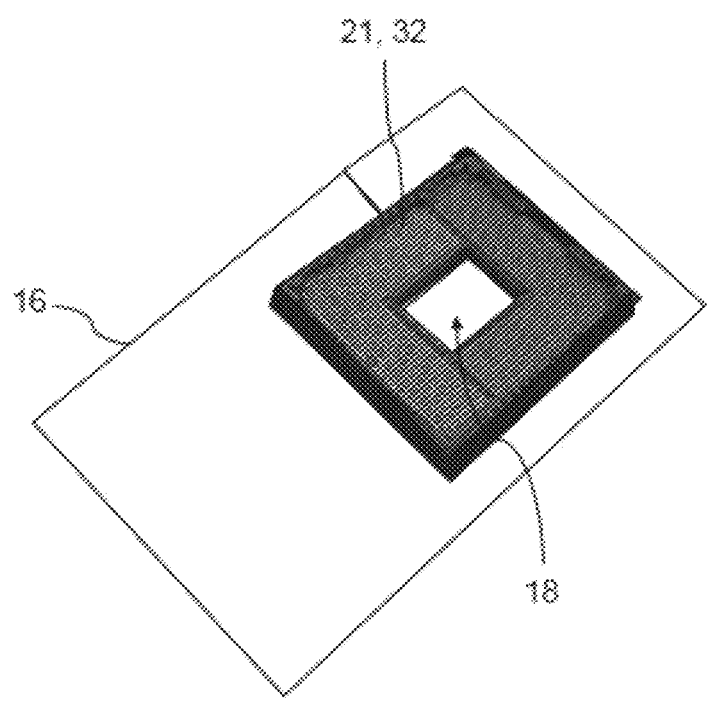
FIG. 13 schematically shows a bottom view of the balcony board as shown in FIG. 12.

FIG. 13 is a bottom view of balcony board 16 from FIG. 12. Balcony board 16 shows opening 18 for heat sink 60 (shown in FIG. 12) mounted on top of processor module 12, which is surrounded by socket 21 for connecting balcony board 16 to processor module 12.

Figure 14:
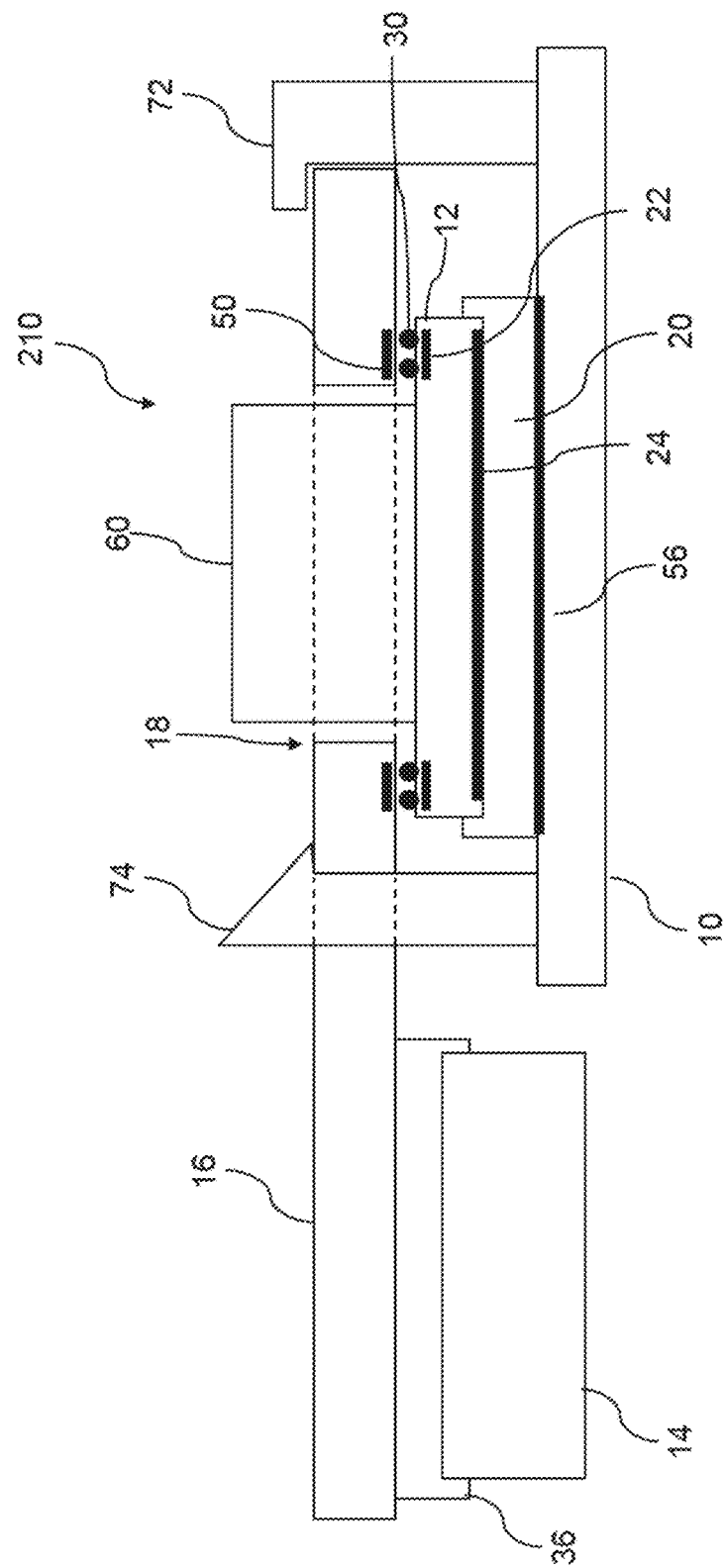
FIG. 14 schematically shows a cross section through a data processing system according to an embodiment of the invention, comprising a balcony board connected to a processor module via direct soldering on the top side of the processor module, whereas the processor module is connected by the socket of a mainboard to the bottom side of the processor module. The balcony board carries DIMM memory modules connected via sockets and is mechanically fixed to the mainboard by support means.

In FIG. 14, a cross section through data processing system 210 is shown that includes: balcony board 16 connected to processor module 12 via direct soldering on the top side of processor module 12, whereas mainboard 10 is connected to the bottom side of processor module 12 via socket 20. Balcony board 16 carries DIMM memory modules 14 connected via sockets 36 and is mechanically fixed to mainboard 10 by support means 72, 74.

Processor module 12 is connected to balcony board 16 via direct soldering contact 30 and connected to mainboard 10 via socket 20, which is directly soldered to mainboard 10.

Balcony board 16 with soldered processor module 12 may be aligned to socket 20 of mainboard 10. This is done by positioning the edge of balcony board 16 under the mechanical stop of support means 72, and then pushing the other end of balcony board 16 down until it is caught by the mechanical latch of support means 74.

Figure 15:
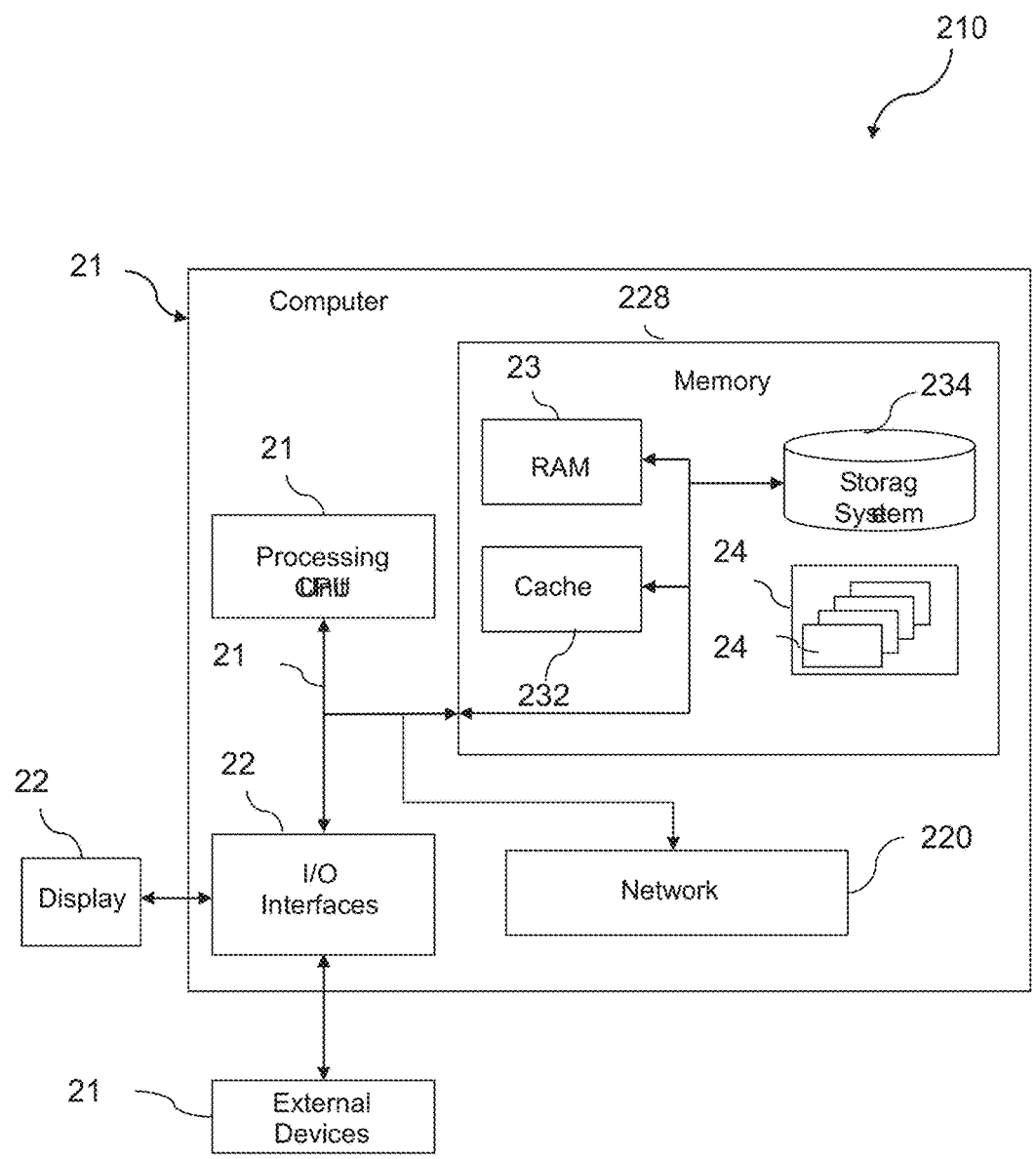
FIG. 15 schematically shows an example embodiment of a data processing system for carrying out a method according to the invention.

Referring now to FIG. 15, a functional schematic of an example of a data processing system 210 as proposed above is shown. Data processing system 210 is only one example of a suitable data processing system and is not intended to suggest any limitation as to the scope of use or functionality of embodiments of the invention described herein. Regardless, data processing system 210 is capable of implementing and/or performing any of the functionality set forth herein above.

The data processing system 210 is capable of running a computer program product including a computer usable medium with a computer readable program, wherein the computer readable program when executed on a computer system 212 causes the computer system 212 to operate the data processing system 210.

In data processing system 210 there is a computer system/server 212, which is operational with numerous other general purpose or special purpose computing system environments or configurations. Examples of well-known computing systems, environments, and/or configurations that may be suitable for use with computer system/server 212 include, but are not limited to, micro-controllers, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 212 may be described in the general context of computer system executable instructions, such as program modules, being executed by a computer system. Generally, program modules may include routines, programs, objects, components, logic, data structures, and so on that perform particular tasks or implement particular abstract data types. Computer system/server 212 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 15, computer system/server 212 in data processing system 210 is shown in the form of a general-purpose computing device. The components of computer system/server 212 may include, but are not limited to, one or more processors or processing units 216, a system memory 228, and a bus 218 that couples various system components including system memory 228 to processor 216. Bus 218 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 212 typically includes a variety of computer system readable media. Such media may be any available media that is accessible by computer system/server 212, and it includes both volatile and non-volatile media, removable and non-removable media.

System memory 228 can include computer system readable media in the form of volatile memory, such as random access memory (RAM) 230 and/or cache memory 232. Computer system/server 212 may further include other removable/non-removable, volatile/non-volatile computer system storage media. By way of example only, storage system 234 can be provided for reading from and writing to a non-removable, non-volatile magnetic media (not shown and typically called a "hard drive"). Al magnetic disk drive (not shown) for reading from and writing to a removable, non-volatile magnetic disk (e.g., a "floppy disk") can be used. An optical disk drive (not shown) for reading from or writing to a removable, non-volatile optical disk such as a CD-ROM, DVD-ROM or other optical media can be also be used. In such instances, each can be connected to bus 218 by one or more data media interfaces. As will be further depicted and described below, memory 228 may include at least one program product having a set (e.g., at least one) of program modules that are configured to carry out the functions of embodiments of the invention.

Program/utility 240, having at least one set of program modules 242, can be stored in memory 228 as well as an operating system, one or more application programs, other program modules, and program data.

Each of the operating system, one or more application programs, other program modules, and program data or some combination thereof, can include an implementation of a networking environment. Program modules 242 generally carry out the functions and/or methodologies of embodiments of the invention as described herein.

Computer system/server 212 may also communicate with one or more external devices 214 such as a keyboard, a pointing device, a display 224, etc.; one or more devices that enable a user to interact with computer system/server 212; and/or any devices (e.g., network card, modem, etc.) that enable computer system/server 212 to communicate with one or more other computing devices. Such communication can occur via Input/Output (I/O) interfaces 222. Computer system/server 212 can communicate with one or more networks such as a local area network (LAN), a general wide area network (WAN), and/or a public network (e.g., the Internet) via network adapter 220. As depicted, network adapter 220 communicates with the other components of computer system/server 212 via bus 218. It should be understood that although not shown, other hardware and/or software components could be used in conjunction with computer system/server 212. Examples, include, but are not limited to: microcode, device drivers, redundant processing units, external disk drive arrays, RAID systems, tape drives, and data archival storage systems, etc.

The block diagrams in the Figures illustrate the architecture, functionality, and operation of possible implementations of systems, methods and computer program products according to various embodiments of the present invention. In this regard, each block in the block diagrams may represent a module, segment, or portion of code, which comprises one or more executable instructions for implementing the specified logical functions. It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

The invention claimed is:

1. A data processing system including a mainboard, at least one processor module, and at least one memory module, the system comprising:
   at least one balcony board carrying at least one of the processor modules and at least one of the memory modules, wherein the processor module has a first pin area comprised in a land grid array (LGA) having pins therein of a fixed arrangement for connecting to the balcony board and a second pin area for connecting to the mainboard, such that the balcony board is attached to the mainboard in a fixed position; and
   an opening in the balcony board through which the processor module is plugged in a socket attached to the mainboard.

2. The data processing system according to claim 1, wherein the first pin area and the second pin area are located on the same side of the processor module.

3. The data processing system according to claim 1, wherein the first pin area and the second pin area are located on different sides of the processor module.

4. The data processing system according to claim 1, wherein the balcony board is carrying one or more PCIe connectors.

5. The data processing system according to claim 1, wherein the opening in the balcony board is configured as an alignment tool for horizontal alignment of the balcony board with the processor module and/or the socket.

6. The data processing system according to claim 1, wherein the processor module is connected to the balcony board via a direct soldering contact or via a socket.

7. The data processing system according to claim 1, wherein the mainboard and the balcony board are connected via the processor module in a socket of the mainboard.

8. The data processing system according to claim 1, wherein the material of the mainboard has dielectric parameters which are different from dielectric parameters of the material of the balcony board.

9. The data processing system according to claim 1, wherein the processor module is a network chip.

10. The data processing system according to claim 1, wherein the processor module is arranged in a communication line between the mainboard and the balcony board.

11. Data processing system according to claim 1, wherein at least one balcony board is connected to at least one network chip being arranged on the mainboard.

12. A data processing system including a mainboard, at least one processor module, and at least one memory module, the system comprising:
   at least one balcony board carrying at least one of the processor modules and at least one of the memory modules, wherein the processor module has a first pin area comprised in a land grid array (LGA) having pins therein of a fixed arrangement for connecting to the balcony board and a second pin area for connecting to the mainboard, such that the balcony board is attached to the mainboard in a fixed position; and
   an opening in the mainboard through which the processor module is plugged in a socket attached to the balcony board.

13. The data processing system according to claim 12, wherein the first pin area and the second pin area are located on the same side of the processor module.

14. The data processing system according to claim 12, wherein the first pin area and the second pin area are located on different sides of the processor module.

15. The data processing system according to claim 12, wherein the balcony board is carrying one or more PCIe connectors.

16. The data processing system according to claim 12, wherein the opening in the mainboard is configured as an alignment tool for horizontal alignment of the mainboard with the processor module and/or the socket.

17. The data processing system according to claim 12, wherein the processor module is connected to the mainboard via a direct soldering contact or a socket.

18. The data processing system according to claim 12, wherein the mainboard and the balcony board are connected via the processor module in a socket of the balcony board.

19. A board for a data processing system, wherein the board is selected from the group consisting of a mainboard and a balcony board:
   wherein the mainboard comprises:
      at least one opening for receiving a processor module and at least one pin area adjacent to the opening, wherein the opening is for connecting the mainboard to a processor module by pins of the at least one pin area of the mainboard comprised in a land grid array (LGA) having pins therein of a fixed arrangement and, when installed, by pins of a balcony at a same side of the processor module; and
   wherein the balcony board comprises:
   at least one opening for receiving a processor module and at least one pin area adjacent to the opening on the balcony board, wherein the opening is for connecting the balcony board to a processor module by pins of the at least one pin area of the balcony board and, when installed, by pins of the mainboard at the same side of the processor module.

20. The data processing system according to claim 19, wherein the mainboard and the balcony board are located on different sides of the processor module.

* * * * *